(12) United States Patent
Gregory et al.

(10) Patent No.: US 8,052,324 B2
(45) Date of Patent: Nov. 8, 2011

(54) THIN FILM CERAMIC THERMOCOUPLES

(75) Inventors: Otto Gregory, Wakefield, RI (US); Gustave Fralick, Middleburg Heights, OH (US); John Wrbanek, Sheffield Village, OH (US); Tao You, Waukegan, IL (US)

(73) Assignees: Board of Governors for Higher Education, State of Rhode Island and Providence Plantations, Providence, RI (US); National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/700,287

(22) Filed: Feb. 4, 2010

(65) Prior Publication Data

US 2011/0023619 A1    Feb. 3, 2011

Related U.S. Application Data

(63) Continuation of application No. 11/529,127, filed on Sep. 28, 2006, now abandoned.

(51) Int. Cl.
*G01K 7/00* (2006.01)
*H01L 35/12* (2006.01)

(52) U.S. Cl. ..................... 374/179; 136/236.1

(58) Field of Classification Search .......... 374/179; 136/236.1
See application file for complete search history.

(56) References Cited

U.S. PATENT DOCUMENTS

| | | | |
|---|---|---|---|
| 4,029,472 A | 6/1977 | Micheli et al. | |
| 4,732,620 A | 3/1988 | Hunold et al. | |
| 4,969,956 A | 11/1990 | Kreider et al. | |
| 4,990,193 A | 2/1991 | Kimura | |
| 5,038,303 A | 8/1991 | Kimura | |
| 5,069,726 A | 12/1991 | Ragless | |
| 5,232,286 A | 8/1993 | Dubreuil et al. | |
| 5,251,981 A | 10/1993 | Kreider | |
| 5,338,566 A | 8/1994 | Gregory et al. | |
| 5,474,619 A | 12/1995 | Kreider | |
| 5,627,637 A | 5/1997 | Kapteyn | |
| 5,861,558 A | 1/1999 | Buhl et al. | |
| 6,427,539 B1 | 8/2002 | Chen et al. | |
| 6,521,966 B1 | 2/2003 | Ishio et al. | |
| 6,729,187 B1 | 5/2004 | Gregory | |
| 6,796,711 B2 | 9/2004 | Colson et al. | |
| 7,029,173 B2 | 4/2006 | Engel et al. | |

OTHER PUBLICATIONS

Dyer et al, "Preparation and piezoresistive properties of reactively sputtered indium tin oxide thin films", Thin Solid Films 288, 1996, pp. 279-286.
Gregory et al, "An apparent n to p transition in reactively sputtered indium-tin-oxide high temperature strain gages", Thin Solid Films 405, 2002, pp. 263-269.
Gregory et al, "High temperature stability of indium tin oxide thin films", Thin Solid Films 406, 2002, pp. 286-293.

(Continued)

*Primary Examiner* — Lisa Caputo
*Assistant Examiner* — Mirellys Jagan
(74) *Attorney, Agent, or Firm* — Gesmer Updegrove LLP

(57) ABSTRACT

A thin film ceramic thermocouple (10) having two ceramic thermocouple (12, 14) that are in contact with each other in at least on point to form a junction, and wherein each element was prepared in a different oxygen/nitrogen/argon plasma. Since each element is prepared under different plasma conditions, they have different electrical conductivity and different charge carrier concentration. The thin film thermocouple (10) can be transparent. A versatile ceramic sensor system having an RTD heat flux sensor can be combined with a thermocouple and a strain sensor to yield a multifunctional ceramic sensor array. The transparent ceramic temperature sensor that could ultimately be used for calibration of optical sensors.

21 Claims, 5 Drawing Sheets

OTHER PUBLICATIONS

NASA Aerospace Propulsion and Power Program NRA-01-GRC-02 Ceramic Strain Gages for Use at Temperatres up to 1500C Annual Technical Report, Dec. 2001-Oct. 2002, pp. 1-25.

Cahill et al., "Thermometry and Thermal Transport in Micro-Nanoscale Solid-State Devices and Structures", Journal of Heat Transfer, Apr. 2002, vol. 124, pp. 223-241.

Cahill et al., "Nanoscale thermal transport", Journal of Applied Physics, Jan. 15, 2003, vol. 93, No. 2, pp. 793-818.

Gregory et al, "Piezoresistive Properties of ITO Strain Sensors Prepared with Controlled Nanoporosity", Journal of the Electrochemical Society, vol. 151, No. 8, 2004, pp. H198-203.

Gregory et al, "Piezoresistive Properties of Ceramic Strain Sensors with Controlled Nanporosity", Materials Research Society Proceedings 785 (489), 2003, 6 pages.

Gregory et al, "Stabilization of Indium Tin Oxide Films to Very High Temperatures", Ma. Res. Soc. Symp. Proc., vol. 751, 2003, pp. 109-114.

Gregory et al, "Stabilization of Ceramic Strain Gages to Temperatures beyond 1500C" Proceedings of the Instrumentation, Systems, and Automation Society, ISA vol. 443, No. 1, 2003, 12 pages.

Gregory et al, "Stability and Piezoresistive Properties of Indium-Tin-Oxide Ceramic Strain Gages", IEEE Sensor Proceedings, 801, 2003, 6 pages.

Gregory et al, "Piezoresistive Properties of Ceramic Strain Sensors with Controlled Nanporosity", PowerPoint presentation at MRS Fall 2003 meeting, Dec. 5, 2003.

Gregory et al, Ongoing Research "Ceramic Strain Sensors for Use at Temperatures up to 1500C", PowerPont presentation for Propulsion Instrumentation Working Group, Nov. 14, 2003.

Gregory et al, "Stability and Piezoresistive Properties of Ceramic Strain Gages", PowerPoint presentation at IEEE Sensors 2003, Oct. 24, 2003.

Costescu et al., "Ultra-Low Thermal Conductivity in W/Al2O3 Nanolaminates", Science, vol. 303, Feb. 13, 2004, 2 pages.

Otto Gregory and Qing Luo, "A self compensated ceramic strain gage for use at elevated temperatures", Sensors and Actuators A 88 (2001) 234-240. Published in the United States.

THIN FILM CERAMIC THERMOCOUPLES

PRIORITY INFORMATION

This application is a continuation of U.S. patent application Ser. No. 11/529,127, filed on Sep. 28, 2006, now abandoned, which claims the benefit of International Patent Application Serial No. PCT/US05/012004 filed on Apr. 12, 2005 and claims priority to U.S. Provisional Patent Application 60/561,393 filed on Apr. 12, 2004, all of which are incorporated herein by reference in their entirety.

GOVERNMENT SPONSORSHIP

This invention was made with government support under Grant No. NRA-01-GRC-02 Contract No. NAG3-2655 awarded by the National Aeronautic and Space Administration (NASA).

BACKGROUND OF THE INVENTION

The development of new engine materials and designs has allowed turbines to be operated at much higher temperature and thus, achieve higher efficiencies. In order to evaluate engine performance, it is necessary to monitor the temperature of all of the static and dynamic components in the turbine environment. Several techniques have been used to monitor the surface temperature of blades and vanes, including wire thermocouples, infrared photography, pyrometry and thermal paints. One technique employs embedded thermocouple wires in the blade wall, but this technique may cause serious structural and aerodynamic problems, disturbing the flow of cooling air. Infrared photography has been used for this purpose but is a non-contact method where the thermal radiation patterns of an object are converted into a visible image. These techniques are not easily transferable to the gas turbine engine environment for temperature monitoring where smoke or other particulates may scatter the light. The extreme temperatures and velocities within a turbine gas engine also make it difficult to produce reliable infrared images. Pyrometry can be used at a reasonably large distance from the object as long as the object can be brought into focus, but this technique requires that the areas of engine are line of sight accessible. It is important to note that adsorption by dust, windows, flames, gases and other optical interferences can produce errors. Another method to measure surface temperature is the use of thermal paints, which are convenient to use and give a visual display or thermal map of the component. Such paints however, do not exhibit the adhesion necessary to survive the harsh environment in gas turbine engine.

SUMMARY

As operating temperatures in gas turbine engines are pushed to higher levels, engine designs must rely on complex cooling systems and ceramic coatings to maintain the structural integrity of the metallic blades and vanes. Embedded wire thermocouples are frequently used for temperature measurement in the gas turbine engine environment but as the blades get thinner, the structural integrity can become compromised. A thin film ceramic thermocouple based on indium-tin-oxide (ITO) alloys may be used to measure the surface temperature of both static and rotating engine components employed in propulsion systems that operate at temperatures in excess of 1300° C. By fabricating two different ITO elements, each having substantially different charge carrier concentrations, it is possible to construct a robust ceramic thermocouple. A thermoelectric power of 6.0 µV/° C., over the temperature range 25-1250° C. has been measured for an unoptimized thin film ceramic thermocouple.

Testing in a computer controlled burner rig showed that ITO thermocouples exhibited a linear voltage-temperature response over the temperature range 25-1250° C. Not only was the thermoelectric power a critical measure of performance of thermocouples in these applications but the electrical and chemical stability was equally important in these harsh conditions, since these temperature sensors must survive tens of hours of testing at elevated temperatures. To enhance the carrier concentration difference in the different legs of thermocouple, ITO thin films were deposited by radio frequency (rf) sputtering in different oxygen, nitrogen, and argon plasmas. ITO thin films prepared in nitrogen rich plasmas have survived temperatures in excess of 1575° C. for tens of hours. SEM micrographs revealed that the surfaces of the ITO thin films after high temperature exposure exhibited a partially sintered microstructure with a contiguous network of ITO nanoparticles. In these films, nitrogen was metastably retained in the individual ITO grains during deposition. Nitrogen diffused out of the bulk grains at elevated temperature and eventually became trapped at grain boundaries and triple junctions. Not only are these ceramic thermocouples being considered for propulsion applications, other applications such as glass melting and steel making are also being considered. Thermal cycling of ITO thin films in various oxygen partial pressures showed that the temperature coefficient of resistance (TCR) was nearly independent of oxygen partial pressure, with TCR's ranging from 1320 ppm/° C. to 1804 ppm/° C. at temperatures above 800° C., and eventually became independent of oxygen partial pressure after repeated thermal cycling below 800° C.

It is an object of the present invention to provide a versatile ceramic sensor system having an RTD heat flux sensor which can be combined with a thermocouple and a strain sensor to yield a multifunctional ceramic sensor array.

It is another object of the invention to provide a ceramic sensor array prepared under different plasma conditions, e.g., different oxygen and nitrogen partial pressures in the argon plasma and having very high temperature stability.

It is another object of the invention to provide a transparent ceramic temperature sensor that could ultimately be used for calibration of optical sensors.

It is still another object of the invention to provide an ITO ceramic sensor which can be used in aerospace applications, glass melting and steel making applications.

BRIEF DESCRIPTION OF THE DRAWINGS

The following description may be further understood with reference to the accompanying drawings in which.

DETAILED DESCRIPTION OF THE INVENTION

Figure 1:
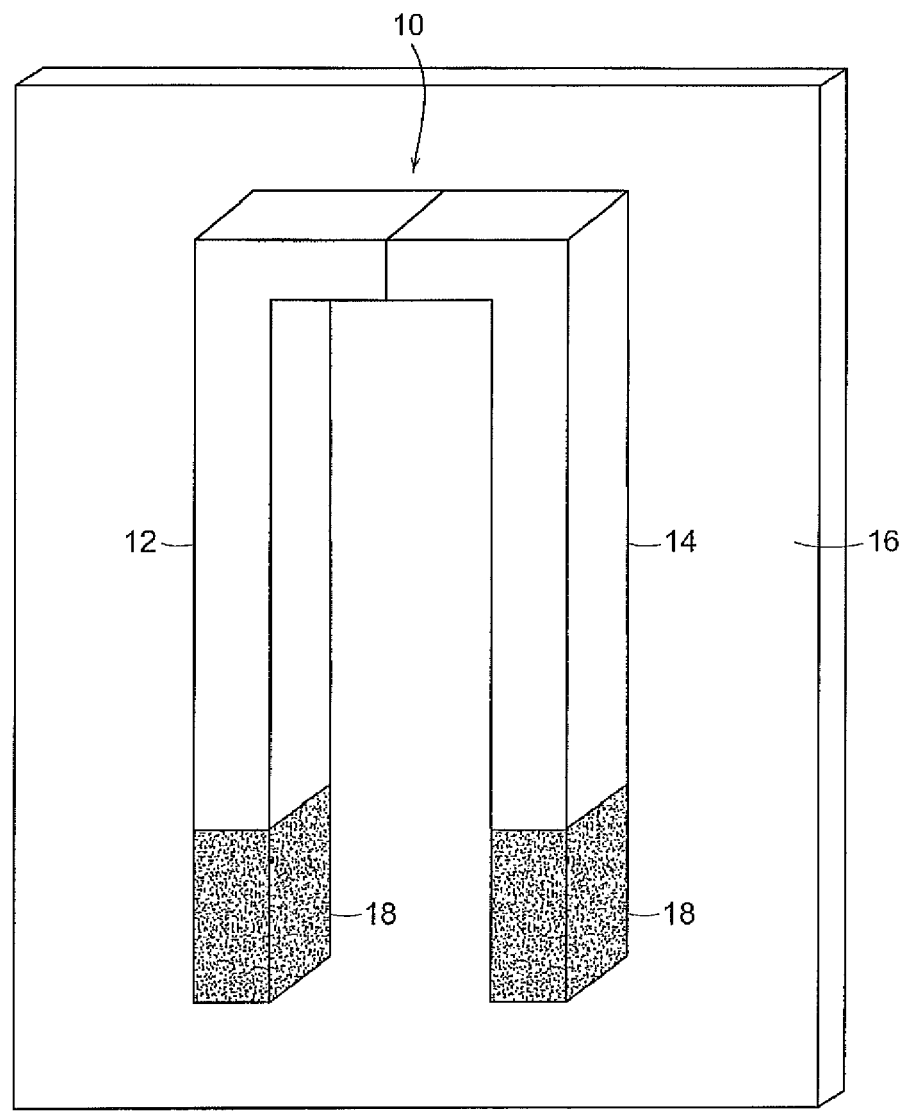
FIG. 1 shows a thin film ceramic thermocouple in accordance with an embodiment of the invention.

Generally shown in FIG. 1, is a thin film thermocouple 10 including a first and second element 12, 14 positioned on a substrate 16. Thin film metallic leads are indicated at 18. Thin film thermocouples deposited on the blades and vanes of gas turbine engines can serve as an ideal means of measuring the surface temperature of engine components during operation. The sensitivity and response of thermocouples are based on the development of an electromotive force (emf), which is dependent on the electrical resistivity of the individual metals used to form the couple. Thin film thermocouples can accurately measure the surface temperature of engine components because they have low thermal mass and thus, provide a more accurate measurement of the temperature at a specific point. The small inertial mass of thin films also translates into a negligible impact on vibration patterns. They are also non-intrusive in that the thermocouple thickness is considerably less than the gas phase boundary layer thickness. Thus, the gas flow path through the engine will not be adversely affected. Critical to implementation of thin film temperature sensor technology in advanced aerospace application is the chemical and electrical stability of the active sensor elements and the magnitude of the thermoelectric power at elevated temperatures. Ceramic thermocouples based on reactively sputtered indium-tin-oxide (ITO) thin films can measure the surface temperature of both stationary and rotating engine components employed in propulsion systems that operate at temperatures in excess of 1500° C. ITO solid solutions dissociate in pure nitrogen at temperatures above 1100° C., but are stable in pure oxygen atmosphere at temperature up to 1600° C. The sensor elements are oxidation resistant and do not undergo any phase change when thermally cycled between room temperature and 1500° C.

Currently used platinum based thermocouples are expensive, have a limited temperature range, are prone to yield errors due to catalytic effects and can give results that can deviate by as much as 50° C. from the actual temperature. Platinum and rhodium thermocouples are prone to creep and other metallurgical effects at elevated temperature. The sensitivity and response of thermocouples are based on the development of an electromotive force (emf), which is dependent on the electrical properties of the individual thermoelements, namely the density of free carriers. By controlling ITO deposition conditions, a robust ceramic thermocouple can be produced using two different ITO elements with substantially different charge carrier concentrations and resistivities.

Figure 2B:
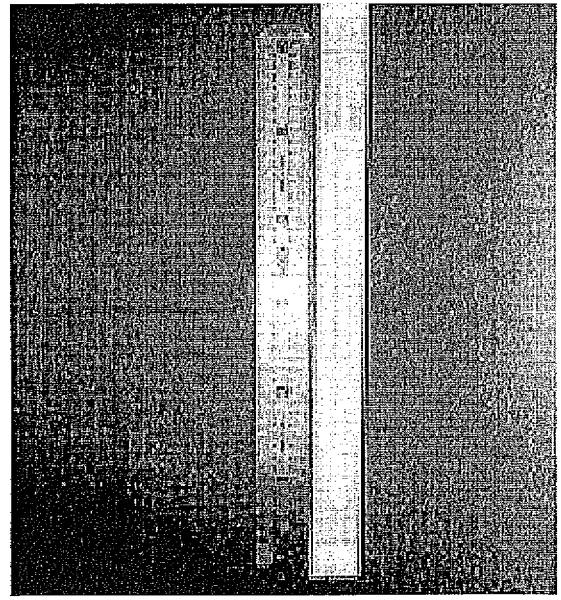
FIGS. 2A and B are photographs of a high-temperature test of a ceramic thermocouple on a quartz substrate and a ceramic thermocouple fabricated on an alumina rod.
Figure 2A:
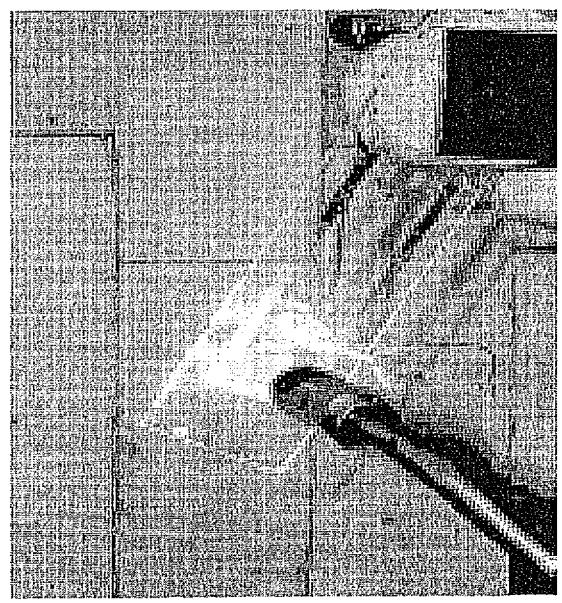

High purity aluminum oxide substrates were used for all high temperature electrical tests, since they provide excellent electrical isolation and stability at high temperature. These substrates were cleaned by rinsing in acetone, methanol and deionized water, followed by a dry nitrogen blow dry. Shadow masking techniques were used to fabricate all thin film thermocouples. The ITO films were deposited by rf sputtering and the platinum/rhodium (10%) films were also deposited by rf sputtering. A high density ITO target (12.7 cm in diameter) with a nominal composition of 90 wt % $In_2O_3$ and 10 wt % $SnO_2$ was used to deposit ITO thermoelements and high purity (99.9999%) platinum and platinum/rhodium targets (10.7 cm in diameter) were used for all platinum depositions. The sputtering chamber was evacuated to a background pressure of less than $1\times10^{-6}$ torr prior to sputtering and semiconductor grade argon, oxygen and nitrogen were leaked into the chamber to establish a total gas pressure of 9 mtorr. The oxygen, argon and nitrogen partial pressures were maintained in the deposition chamber using MKS mass flow controllers sold by MKS Instruments, Inc. of Andover, Mass. and rf power density of 2.4 $W/cm^2$ was used for all ITO sputtering runs. Platinum films (3 μm thick) were used to form ohmic contacts to the active ITO thermoelements and thin film leads to make electrical connection. A computer controlled burner rig and a Deltech tube furnace with a 7-inch hot zone was used for high temperature experiments (FIG. 2). The furnace was ramped at 3° C./min to the desired temperature in 50° C. increments and held for at least 1 hour to establish thermal equilibrium. The corresponding resistance changes were monitored with a 6-digit multimeter (Hewlett-Packard 34401A sold by Hewlett-Packard Company, Inc. of Cupertino, Calif.) and a programmable constant current source (Keithley 224). A Hewlett-Packard multimeter and Keithley constant current source were interfaced to an I/O board and an IBM 488 GPIB card (sold by International Business Machines, Inc. of Armonk, N.Y.) for continuous data acquisition using Lab windows software. A type S thermocouple connected to a second multimeter was used to measure the temperature inside the Deltech furnace.

Figure 3:
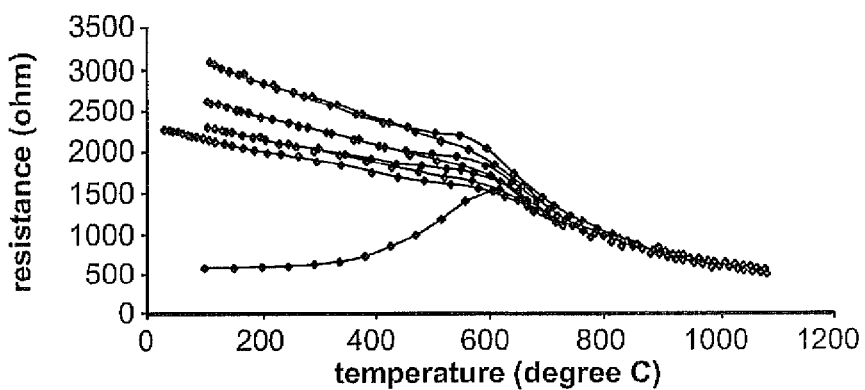
FIG. 3 is a graph of electrical resistivity of indium-tin-oxide (ITO) in low oxygen partial pressure wherein the films are sputtered in an oxygen and argon plasma.
Figure 4:
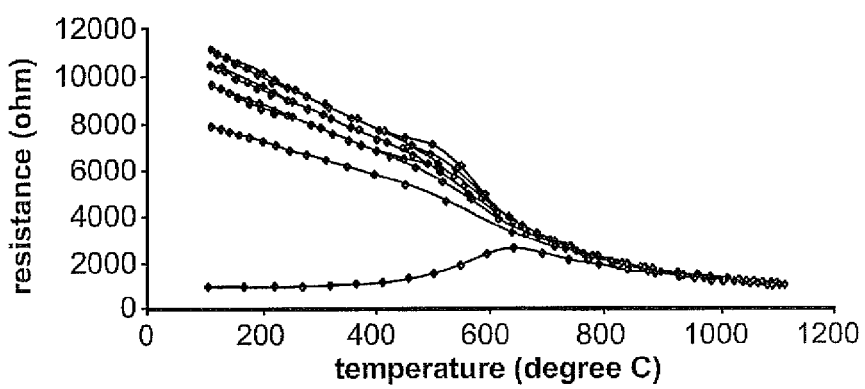
FIG. 4 is a graph of electrical resistivity of ITO in high oxygen partial pressures wherein the films are sputtered in an oxygen and argon plasma.

Electrical and chemical stability of the sputtered ITO is critical to the performance of these temperature sensors, since these ceramic sensors must survive tens of hours of testing at elevated temperature. Towards this end, high temperature stability of ITO thin films was evaluated at temperatures up to 1250° C. under different oxygen partial pressures. The properties of the ITO elements were measured continuously during thermal cycling to establish the temperature coefficient of resistance (TCR). This was used as an indirect measure of thermocouple stability from the viewpoint of charge carrier concentration. The desired partial pressures were established by mixing argon and oxygen in different ratios followed by thermal cycling between 25° C. and 1500° C. Results of testing under low oxygen partial pressures (FIG. 3) and high oxygen partial pressures (FIG. 4), showed that temperature coefficient of resistance (TCR) was very stable and not affected by partial pressure at temperatures above 700° C. The change in resistance-temperature behavior was not significant after several testing cycles at temperature above 700° C. These results showed that ITO thin films prepared in argon/oxygen plasmas exhibited reasonably good stability. A temperature coefficient of resistance of 1388 ppm/° C. and 2486 ppm/° C. was observed under low and high oxygen partial pressures, respectively.

Figure 5:
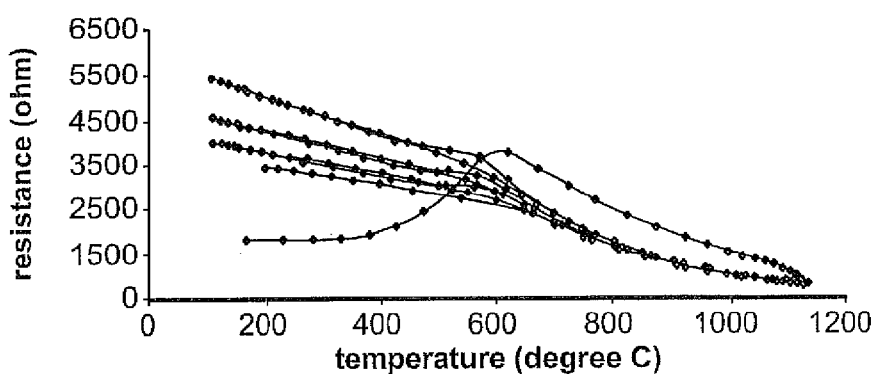
FIG. 5 is a graph of electrical resistivity of ITO in low oxygen partial pressure wherein the films are sputtered in a nitrogen rich plasma.
Figure 6:
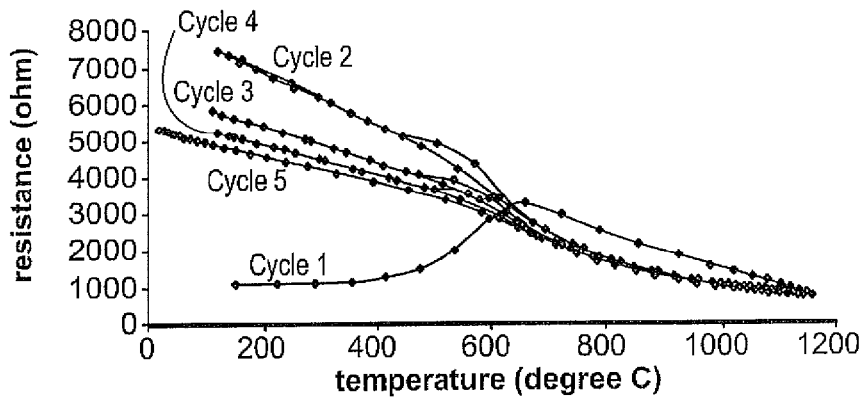
FIG. 6 is a graph of electrical resistivity of ITO in high oxygen partial pressures wherein the films are sputtered in a nitrogen plasma.

A ceramic thermocouple was fabricated by depositing two different ITO films (FIGS. 2A and 2B), each prepared with a very different charge carrier concentration. To insure a reasonable the charge carrier concentration difference in the different elements of the thermocouple, ITO films were prepared by rf sputtering in different oxygen/argon and oxygen/nitrogen/argon plasmas. The high temperature stability of thin films prepared in nitrogen-rich plasmas is shown in FIGS. 5 and 6. After the first thermal cycle, sintering of these nitrogen doped films had occurred and thereafter resulted in excellent stability at elevated temperature (almost independent of oxygen partial pressure in the test environment).

The different electrical conductivity in each thermoelement is controlled by the amount of nitrogen in the plasma. It has been determined that by utilizing nitrogen in the plasma, the thermoelements are unexpectedly able to withstand much higher temperatures. The plasma should include at least some and up to 10 mtorr of nitrogen, 0-10 mtorr of oxygen and 0-10 mtorr of argon. One preferred combination of plasma components includes 6 mtorr of argon, 3 mtorr of nitrogen and 1 mtorr of oxygen.

A temperature coefficient of resistance (TCR) of 1320 ppm/° C. was observed in low oxygen partial pressure and 1748 ppm/° C. was observed in pure oxygen environments. Nitrogen-doped ITO films exhibited greater stability at high temperatures with an almost linear response.

Figure 7:
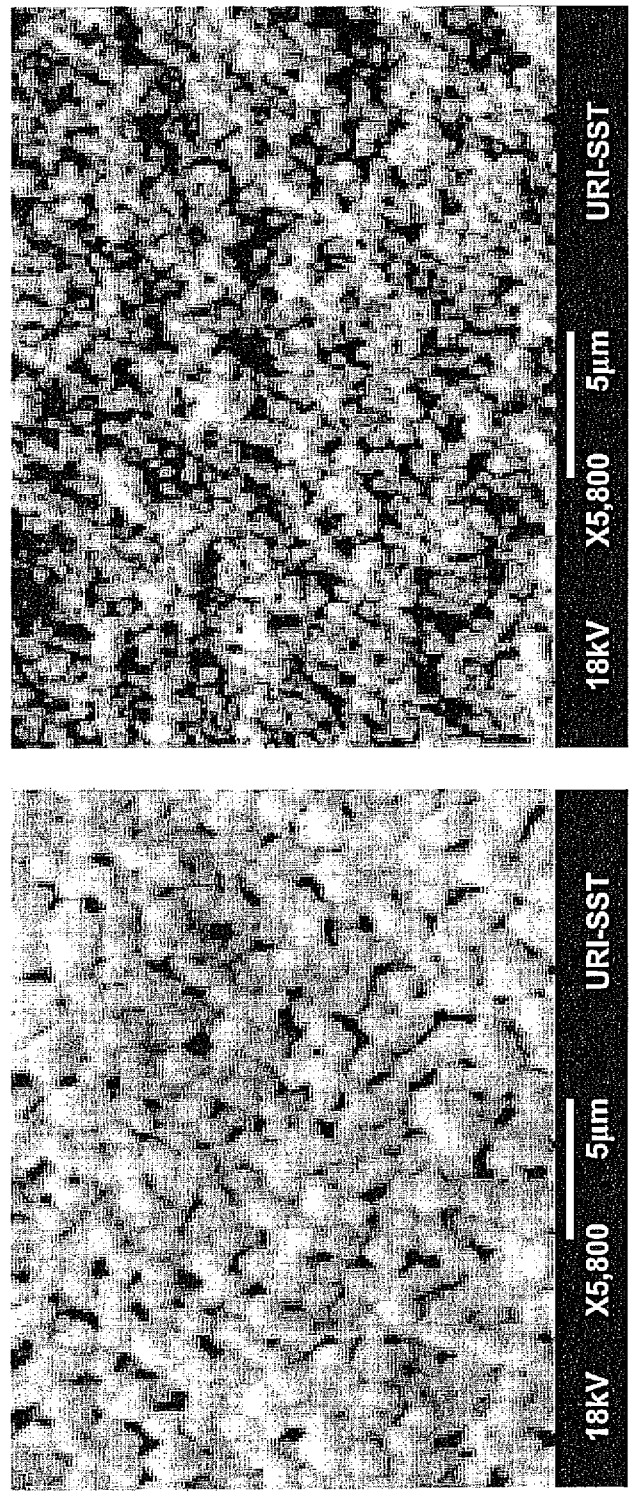
FIG. 7 is scanning electron micrograph of an ITO sensor prepared in an oxygen/argon plasma and an ITO sensor prepared in a nitrogen rich plasma.

ITO temperature sensors were examined by SEM after high temperature exposure. SEM micrographs indicated that a marked change in microstructure had occurred in the ITO films after the first thermal cycle. The SEM micrograph of an ITO sensor subjected to a post-deposition heat treatment in air (FIG. 7) showed a partially sintered microstructure with interconnected nanopores. ITO films prepared in a nitrogen-rich plasma retained more metastable nitrogen in the structure and thus, lead to a much finer microstructure. The average ITO particle size was considerably smaller in the nitrogen sputtered ITO films compared to the oxygen sputtered films and the ITO particles exhibited a more angular and faceted morphology.

In the case of the nitrogen doped ITO films, it appears that more nitrogen was metastably retained in the individual ITO grains during sputtering which later diffused out of the bulk grains at elevated temperature, eventually becoming trapped at grain boundaries and triple junctions. Under these conditions, sintering and densification of the ITO particles containing nitrogen rich grain boundaries was retarded and a contiguous network of nanometer-sized ITO particles was established. In both cases, the controlled microstructure developed in these sensors was achieved by controlling the partial pressure of nitrogen in the interconnected porosity during processing, such that a balance between the rate of decomposition and the rate of sintering was maintained. Since the decomposition of ITO alloys in pure nitrogen atmospheres can occur at temperatures as low as 1100° C., higher equilibrium (decomposition) pressures at these higher temperatures occurs in the nitrogen sputtered films and must be accommodated in the isolated pores to maintain equilibrium. Continued sintering in these nitrogen sputtered films will require even higher temperatures until a new equilibrium is reached. Preliminary experiments indicate that a stable nitride may have also formed on the surfaces of these particles, which can also lead to the stabilization of the ITO nanoparticles.

Figure 8:
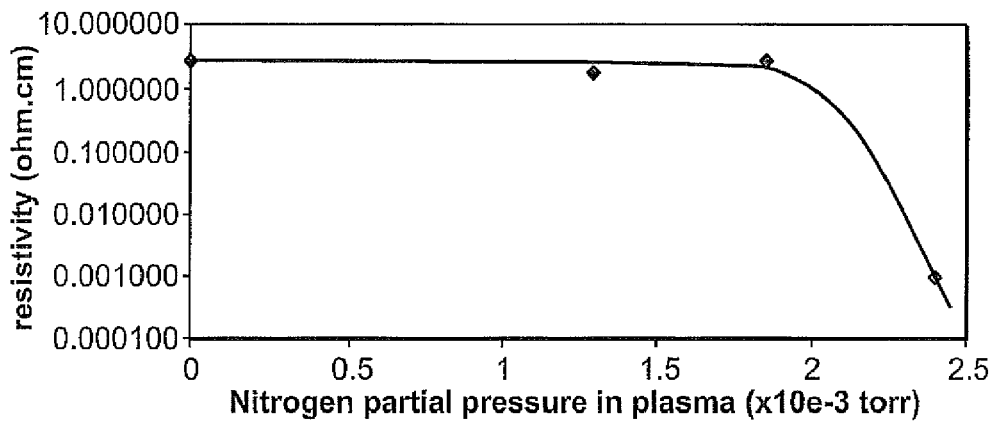
FIG. 8 is a graph of resistivity of ITO sensors in various nitrogen partial pressure environments.

To determine the resistivity and carrier concentration difference in ITO elements comprising the thermocouples, a series of ITO films were sputtered in different argon/oxygen/ nitrogen partial pressures. The reactively sputtered ITO films were determined to be n-type and exhibited typical semiconductor-like resistivities. The resistivity of the as-deposited ITO films was dependent on the nitrogen partial pressure established in the plasma, as shown in FIG. 8. Based on equation (1) below, the charge carrier concentration can be estimated from the resistivity and mobility of the ITO films:

$$p = \frac{1}{q\mu N_e} \quad (1)$$

where q is the charge of electron, $\mu$ is the mobility and $N_e$ is the charge carrier concentration. Generally, increasing the nitrogen partial pressure in the plasma during sputtering resulted in lower resistivity. Increased resistivity of ITO films as a function of oxygen partial pressure is due to the decrease in the oxygen vacancy concentration in the films, via compensation by molecular oxygen. When too much nitrogen was incorporated in plasma however, indium nitride may have formed. In this case, ITO films will become degenerate when nitrogen partial pressures exceed $2.35 \times 10^{-a}$ torr (FIG. 8).

Figure 9:
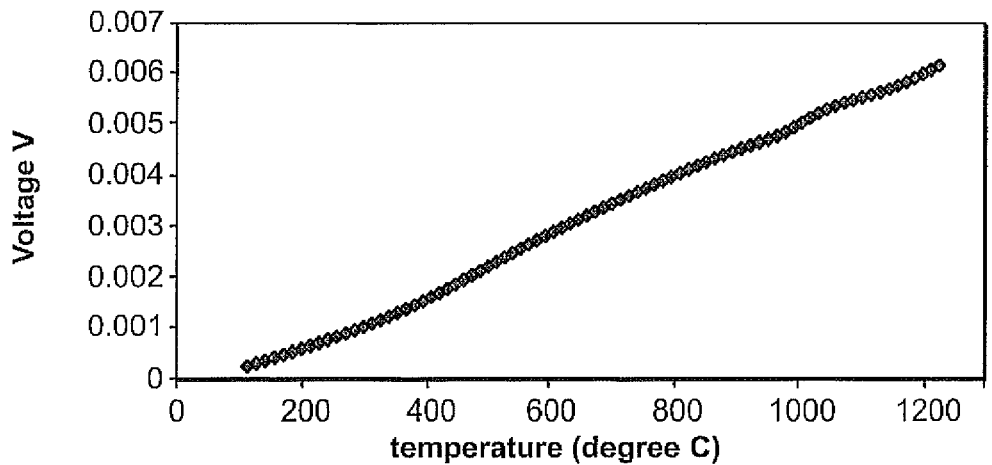
FIG. 9 is a graph of response of ceramic thermocouple during thermal cycling to 1200° C.

The ITO thermocouples were tested from room temperature to 1250° C., and a linear relationship between emf and temperature was observed. As shown in FIG. 9, a thermoelectric power of 6 $\mu$V/° C. was determined over this temperature range. Other ceramic thermocouples prepared with higher nitrogen partial pressure ($1.853 \times 10^{-3}$ torr and $2.43 \times 10^{-3}$ torr) lost their linear response during high temperature testing.

Other transparent conducting oxides include aluminum doped zinc oxide, tin oxide, antimony oxide and antimony tin oxide.

Figure 10:
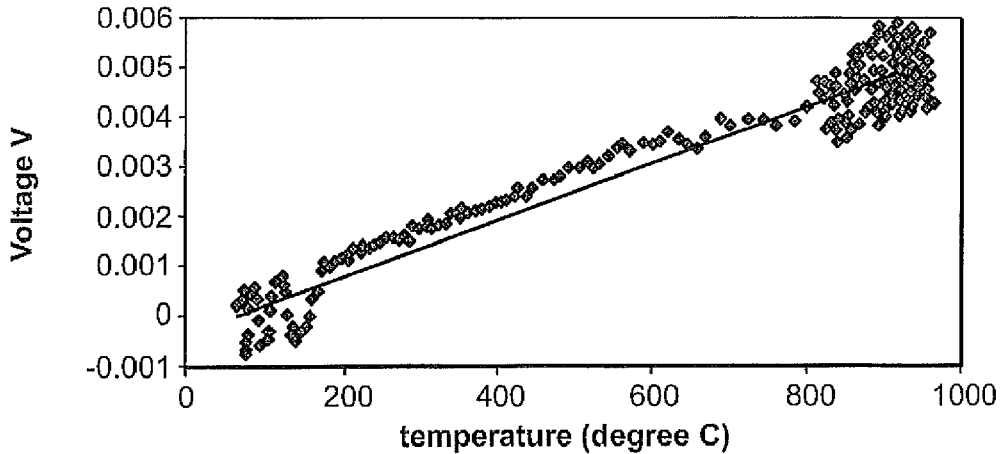
FIG. 10 is a graph of response of ceramic thermocouple during thermal cycling to 1000° C.

To simulate the real engine operation environment, an oxy-propane open flame burner rig was used to test the performance of an ITO ceramic thermal sensor (FIG. 10). The ITO ceramic thermal sensor successfully survived through this severe testing with almost the same thermoelectric power of 6 $\mu$V/° C. discussed above with reference to FIG. 9. The burner rig test further confirmed that ITO ceramic thermocouples were good candidates for the gas turbine engine applications.

Although the present invention has been shown and described with respect to several preferred embodiments thereof, various changes, omissions and additions to the form and detail thereof, may be made therein, without departing from the spirit and scope of the invention.

What is claimed is:

1. A method of preparing a thin film ceramic thermocouple, said method comprises:
   providing a substrate;
   depositing indium-tin-oxide onto said substrate in a plasma of argon, nitrogen and oxygen to form a first thermoelement;
   depositing indium-tin-oxide onto said substrate to form a second thermoelement in a different oxygen/nitrogen/argon plasma than the first thermoelement such that the first and second thermoelements have different charge carrier concentrations;
   coupling the first and second thermoelements to form a thin film ceramic thermocouple.

2. The method of claim 1, wherein the plasma contains 10 mtorr or less of nitrogen, 10 mtorr or less of argon and 10 mtorr or less of oxygen.

3. The method of claim 2, wherein the thin film ceramic thermocouple may operate at a temperature of greater than 1500° C. for an extended period of time.

4. The method of claim 2, wherein each thermoelement has a different electrical conductivity.

5. The method of claim 2, wherein the charge carrier concentration in each thermoelement is controlled by the nitrogen and oxygen partial pressures in the plasma from which said thermoelements are prepared.

6. The thin film ceramic thermocouple prepared in accordance with the method of claim 1.

7. The thin film ceramic thermocouple as claimed in claim 6, wherein the thermocouple may operate at temperatures greater than 1500° C.

8. The thin film ceramic thermocouple as claimed in claim 6, wherein the charge carrier concentrations in each of the first and second thermoelements is controlled by the nitrogen and oxygen partial pressures in the plasma from which the first and second thermoelements are prepared.

9. The thin film ceramic thermocouple as claimed in claim 6, wherein the plasma contains 10 mtorr or less of nitrogen, 10 mtorr or less of argon and 10 mtorr of oxygen or less.

10. The thin film ceramic thermocouple as claimed in claim 6, wherein the thin film ceramic thermocouple is fabricated as a ceramic strain gauge.

11. The thin film ceramic thermocouple as claimed in claim 6, wherein the thin film ceramic thermocouple includes substrates that are electrically insulating.

12. The thin film ceramic thermocouple as claimed in claim 11, wherein at least one substrate is ceramic.

13. A method of preparing a thin film ceramic thermocouple, said method comprises:
   providing a substrate;
   depositing a metal alloy onto said substrate in a plasma of argon, nitrogen and oxygen to form a first thermoelement;
   depositing the metal alloy onto said substrate to form a second thermoelement in a different oxygen/nitrogen/argon plasma than the first thermoelement such that the first and second thermoelements have different charge carrier concentrations;
   coupling the first and second thermoelements to form a thin film ceramic thermocouple.

14. The method of claim 13, wherein the metal alloys are one of the following oxides or mixture thereof, including at least one of indium oxide, antimony oxide, tin oxide and aluminium-doped zinc oxide.

15. The thin film ceramic thermocouple prepared in accordance with the method of claim 13.

16. The thin film ceramic thermocouple as claimed in claim 15, wherein the thermocouple may operate at temperatures greater than 1500° C.

17. The thin film ceramic thermocouple as claimed in claim 15, wherein the charge carrier concentrations in each of the first and second thermoelements is controlled by the nitrogen and oxygen partial pressures in the plasma from which the first and second thermoelements are prepared.

18. The thin film ceramic thermocouple as claimed in claim 15, wherein the plasma contains 10 mtorr or less of nitrogen, 10 mtorr or less of argon and 10 mtorr of oxygen or less.

19. The thin film ceramic thermocouple as claimed in claim 15, wherein the thin film ceramic thermocouple is fabricated as a ceramic strain gauge.

20. The thin film ceramic thermocouple as claimed in claim 15, wherein the thin film ceramic thermocouple includes substrates that are electrically insulating.

21. The thin film ceramic thermocouple as claimed in claim 20, wherein at least one substrate is ceramic.

* * * * *